United States Patent [19]

Schwinn et al.

[11] Patent Number: 5,524,541
[45] Date of Patent: Jun. 11, 1996

[54] METHOD AND APPARATUS FOR CONTROLLING THE BRAKING OF A PRINTING MACHINE

[75] Inventors: Klaus Schwinn, Heusenstamm; Harald Togel, Schlangenbad, both of Germany

[73] Assignee: MAN Roland Druckmaschinen AG, Germany

[21] Appl. No.: 421,898

[22] Filed: Apr. 14, 1995

[30] Foreign Application Priority Data

Apr. 15, 1994 [DE] Germany .......................... 44 13 047.3

[51] Int. Cl.[6] .................................................. B41F 33/08
[52] U.S. Cl. .............................. 101/484; 400/74; 100/53; 318/371
[58] Field of Search ..................... 101/216, 480, 101/483, 484; 400/74; 180/53, 99; 318/371, 370

[56] References Cited

U.S. PATENT DOCUMENTS

| | | | |
|---|---|---|---|
| 4,015,701 | 4/1977 | Templeton | 101/91 |
| 4,074,176 | 2/1976 | Parke et al. | 318/371 |
| 4,750,659 | 6/1988 | Maier | 101/228 |
| 4,951,567 | 8/1990 | Rodi et al. | |
| 5,355,155 | 10/1994 | Mistyurik | 101/91 |

FOREIGN PATENT DOCUMENTS

| | | |
|---|---|---|
| 0187247B1 | 11/1985 | European Pat. Off. . |
| 0243728B1 | 4/1987 | European Pat. Off. . |
| 0572805A2 | 4/1993 | European Pat. Off. . |
| 255264A3 | 3/1988 | Germany . |
| 3614979C2 | 2/1994 | Germany . |

OTHER PUBLICATIONS

DE–Firmenschrift "Modulpac C Baugruppe A6.00 Grund-uberwachung", Siemens AG, 1979, S.6.

Primary Examiner—John S. Hilten
Attorney, Agent, or Firm—Leydig, Voit & Mayer, Ltd.

[57] ABSTRACT

A description of a method and a device for monitoring the braking of a D.C. motor of a printing machine such as a sheet-fed offset printing machine is given. For safety purposes, in the case of an emergency stop an electrical braking should always be carried out with the maximum torque of the D.C. motor. For this purpose, the disclosed method provides that the actual value of the armature current is detected and compared to a maximum permissible value for the electrical braking. In the event of an impermissibly high deviation and, in particular, in the event of an undershoot of the armature current relative to the maximum permissible value, the power converter and motor are disconnected from the power supply and an electrically actuable brake is applied to the motor.

5 Claims, 5 Drawing Sheets

METHOD AND APPARATUS FOR CONTROLLING THE BRAKING OF A PRINTING MACHINE

FIELD OF THE INVENTION

This invention relates generally to printing machines or presses and more particularly to a method and apparatus for monitoring and controlling the braking of the D.C. motor of a printing machine such as a sheet-fed offset printing press.

BACKGROUND OF THE INVENTION

The basic structure of a printing machine such as a sheet-fed offset printing press includes a main drive and an electronic control mechanism. Such a main drive and control mechanism is disclosed in U.S. Pat. No. 4,951,567, which is hereby incorporated by reference. The main drive typically contains three components: (1) an electric main drive; (2) an electromechanically operable brake; and (3) a tachometer generator. The three components of the main drive perform two primary functions, namely, driving and braking. To this end, the electric main drive typically contains a D.C. motor for driving the printing machine. The electromechanically actuable brake is assigned to this D.C. motor and is controlled by the control mechanism. The tachometer generator monitors the D.C. motor and feeds the value of the actual speed of the motor to the electric main drive. The electric main drive subsequently supplies the motor with current in such a way that the actual speed of the motor agrees with a desired value prescribed by the control mechanism of the printing machine. In other words, the tachometer and the electric main drive are typically connected in a feedback loop to control the operation of the D.C. motor.

The second component of the printing press, the electronic control mechanism, can be designed as one or more computers. The typical control mechanism has three components: (1) input sensors; (2) processing electronics; and (3) output electronics. Input sensors are used in the control mechanism to monitor the state of the printing machine. The processing electronics are used to determine whether the machine is operating in an acceptable fashion and to generate appropriate control signals if corrective actions are required. The output electronics relay the control signals generated by the processing electronics to the appropriate components of the printing machine.

In the normal course of operation it is sometimes necessary to bring a printing press to a stop. For example, it may be necessary to stop the machine to perform maintenance procedures or the like. Under such circumstances, the printing machine can be brought to a standstill at a relatively gradual rate. In certain emergency circumstances, however, it may become necessary to stop the printing press very rapidly such that the machine reaches a standstill within a predetermined maximum time period. This braking can be performed purely electrically by applying a braking armature current having a polarity opposite to the armature current which drives the D.C. motor or mechanically by actuating the electromechanical brake. Purely electrical braking is preferably when possible because it is generally less stressful on the components of the printing machine than mechanical braking.

Printing presses such as sheet-fed offset printing machines are often provided with multiple electrically secured guards and a plurality of emergency STOP pushbuttons positioned at various easily accessible locations on the machine. The electrically secured guards prevent an operator from coming into contact with moving or rotating machine parts. If such a guard is opened while the printing machine is running, a signal indicating the existence of an emergency condition is generated and the printing machine is quickly brought to a standstill. Similarly, if an operator or other personnel actuates one or more of the emergency STOP pushbuttons, the printing machine is rapidly brought to a stop. For this purpose, safety conditions exist which prescribe that, after an emergency STOP pushbutton is actuated or after a guard is opened when the machine is operating, the machine must have reached a standstill within a specific maximum time period.

In order to be able to carry out a multiplicity of movement processes both at lower and at higher rotational speeds, modern sheet-fed offset printing machines include, as a rule, D.C. drives with line-commutated power converters (e.g. 4-quadrant drives). This drive structure enables these presses to achieve a wide range of rotational speed settings, high power, and electrical braking. Thus, it is possible for these machines to respond to these emergency conditions (i.e., the opening of a guard with the machine running or the actuation of an emergency STOP pushbutton) by electrically decreasing the rotational speed of the D.C. drives.

However, additional security measures have proven necessary so that sheet-fed offset printing machines which include such a drive can fulfil the above-mentioned safety conditions for emergency stops, namely, bringing the press to a standstill within the prescribed maximum time period. Thus, for example, EP 0 243 728 B1 provides a security system for a printing machine which is not only capable of controlling the actual rotational speed of the drive, but which also monitors and compares the desired and actual values of the rotational speed of the drive during braking and actuates an electromechanical brake if an impermissibly high deviation between these values is detected. This system, thus, first responds to an emergency STOP command by electrically braking the press and, if the actual value of the rotational speed does not reduce rapidly enough, by actuating the mechanical brake. The system uses a tachogenerator or tachometer to detect the actual value of the rotational speed of the drive. This system is disadvantageous because, in the final analysis, the reliability of the safety system depends on the reliability of the rotational speed detection which is to say, on the reliability of the tachometer. A further disadvantage results from the fact that printing machines represent a different load for the drive under different operational conditions and have different levels of freeness in their bearings. As a result, the predetermined rotational speed/time curve is monitored and matched to the minimum possible load torque in the case of an emergency STOP.

EP 0 187 247 B1 discloses another method for monitoring the braking of a printing machine. In this method, a device is used to detect movement of the motor and, the braking torque of the electromagnetic brake is determined based on these readings. However, it is not possible to monitor a purely electrical braking with this method.

EP 0 572 805 A2 discloses a method for monitoring the rotational speed of the drives in a printing machine operating at a creep speed and having a D.C. shunt motor. This method ensures that in specific operating states such as the creep speed state no impermissibly high rotational speed deviation occurs. For this purpose, the armature voltage of the motor is monitored and, in the event of an impermissibly high deviation, a control circuit is interrupted. Thus, a pure rotational speed monitoring of the drive is performed in this method, so that the observance of a required braking process can only be determined by means of additional measures.

OBJECTS OF THE INVENTION

It is a general object of the invention to provide an improved method and apparatus for monitoring the braking of a printing machine. More specifically, it is an object of the invention to provide an improved method for braking the D.C. motor driving a printing press wherein the printing press is brought to a standstill within a predetermined time period. It is a related object to provide an improved method for bringing a printing press to a standstill wherein a electromechanical brake is actuated only if it is determined that purely electrical braking is not bringing the press to a stop within a predetermined time period. It is a related object of the instant invention to provide an improved method and apparatus for controlling the braking of a printing press wherein the braking process will not be prevented by defects in the motor control circuitry including, among other things, defects in the tachometer and/or the power converter.

It is a further object to provide a method and apparatus for braking a printing press wherein the field current of the D.C. drive motor is monitored to ensure that it remains within a range defined by a predetermined minimum value and a predetermined maximum value to achieve proper braking.

It is yet another object to provide a method and apparatus for monitoring the braking of a printing press wherein the polarity of the armature voltage of the D.C. drive motor is detected to ensure that braking is occurring.

SUMMARY OF THE INVENTION

The present invention accomplishes these objectives and overcomes the drawbacks of the prior art by providing a new and improved method for controllably braking a printing machine such as a sheet-fed offset printing press driven by a D.C. motor having an associated electromechanical brake and a line-commutated converter. More specifically, after an emergency STOP command has been detected, a braking armature current is applied to the motor. The magnitude and the polarity of the braking armature current present in the motor is then detected and its magnitude (i.e., the armature current's absolute value) is compared to a specific maximum braking current constant. If the magnitude of the braking armature current deviates from this maximum braking current constant by less than a predetermined maximum braking current deviation constant, the D.C. motor will be brought to a standstill within a predetermined time period without actuating the electromechanical brake. If, on the other hand, the comparison of the measured magnitude of the braking armature current and the predetermined maximum braking current constant determines that the braking armature current differs from the maximum braking current constant by more than the predetermined maximum braking current deviation constant, the D.C. motor is switched torque-free via the power converter (by, for example, disconnecting the power converter from the power supply) and the electromechanical brake associated with the D.C. motor is actuated. The electromechanical brake will then rapidly stop the printing machine. Thus, the D.C. motor will be brought to a standstill within the prescribed time period even if defects occur in the circuitry controlling the D.C. drive, in the power converter, or in the rotational speed detection circuitry (i.e., the tachometer).

These and other features and advantages of the invention will be more readily apparent upon reading the following description of the preferred embodiment of the invention and upon reference to the accompanying drawings wherein:

Figure 1:
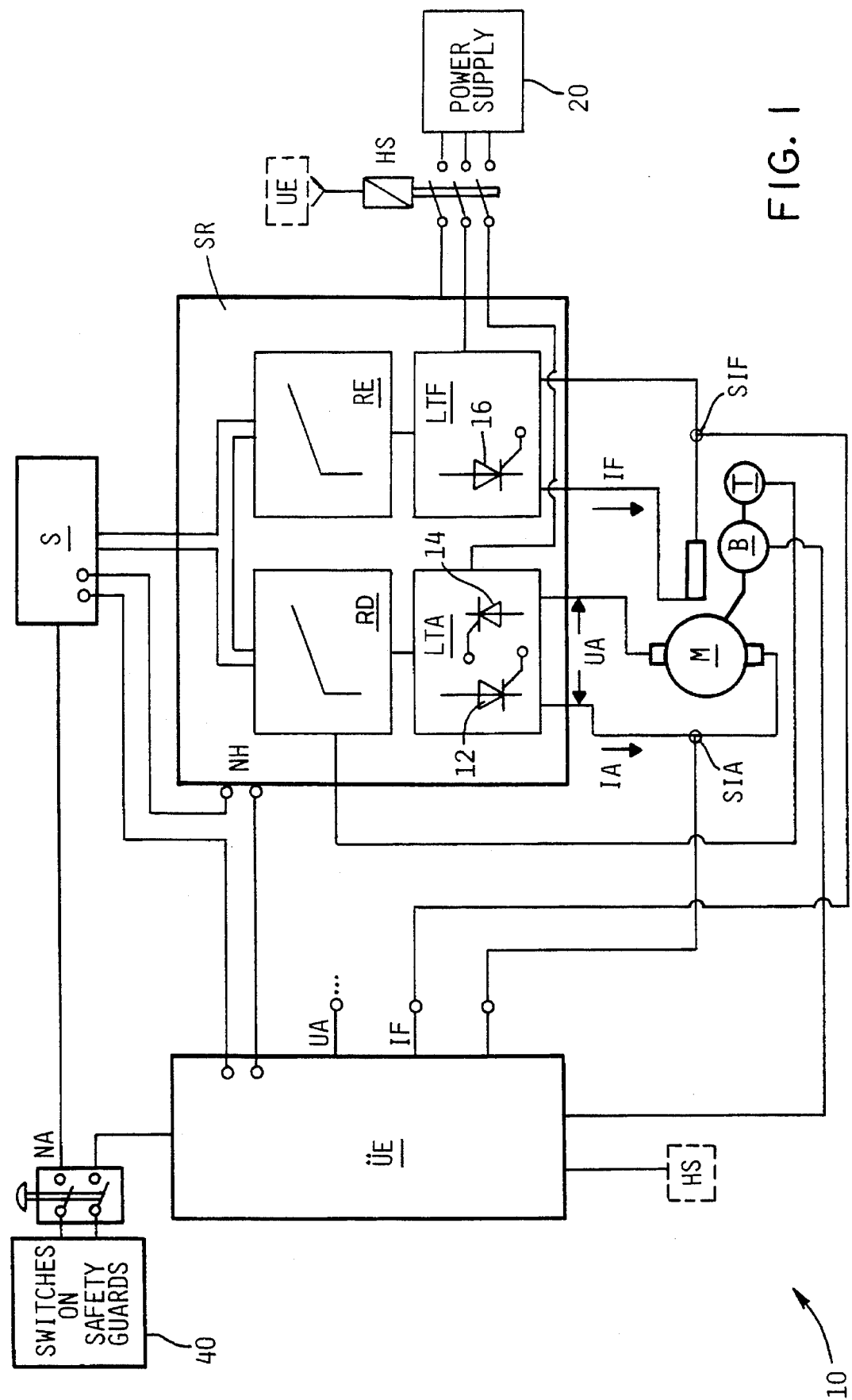
FIG. 1 is a block diagram representation of a drive mechanism for driving a printing machine, the drive mechanism being constructed in accordance with the teachings of the instant invention.

While the invention is susceptible of various modifications and alternative constructions, a certain illustrated embodiment thereof has been shown in the drawings and will be described below in detail. It should be understood, however, that there is no intention to limit the invention to the specific form disclosed, but on the contrary, the intention is to cover all modifications, alternative constructions and equivalents falling within the spirit and scope of the invention.

DETAILED DESCRIPTION OF THE PREFERRED EMBODIMENT

FIG. 1 shows generally a drive mechanism 10 constructed in accordance with the teachings of the instant invention. The drive mechanism 10 is constructed and designed for driving and braking a printing machine such as a sheet-fed offset printing press (not shown). To this end, the drive mechanism 10 comprises a control system S, a line-commutated converter SR, a monitoring device ÜE, and a D.C. motor M with an assigned tachogenerator T and an assigned electromechanically actuable brake B.

The control system S is a programmable logic device such as a personal computer which is programmed to initiate the various functions of the printing machine in response to various actuators such as pushbuttons (not shown). In the interest of brevity, this device will not be discussed in detail here. Instead, the interested reader is referred to co-pending U.S. patent application Ser. No. 08/293,392, which is hereby incorporated by reference, for a more detailed discussion of the structure and functions of the control system S.

The preferred line-commutated converter SR is a commercially available device marketed by Siemens Ag of Germany under the tradename "SIMOREG K, Model 6RA22". As shown in FIG. 1, the most significant components of that device for the purposes of the instant invention include a first power part LTA which is provided with an associated controller RD, and a second power part LTF which is also provided with an associated controller RF. As shown in FIG. 1, the power part LTA comprises two solid state switches 12, 14 connected in inverse parallel relation between the motor and a power supply 20. These solid state switches 12, 14 can be, for example, silicon controlled rectifiers which, controllably conduct various levels of current in proportion to the signal received at their gate terminals in a manner well known in the art. In the instant embodiment, these solid state switches are employed to provide the D.C. motor M with an armature voltage UA and an armature current IA which, depending upon its polarity, can be used for either driving or braking the motor M. To this end, one of the solid state switches 12, 14 is used to provide an armature current IA of a first polarity for driving the motor M while the other switch is used to provide an armature current IA having a second polarity opposite the first polarity for electrically braking the motor M.

The controller RD controls the armature voltage UA and armature current IA such that the D.C. motor M rotates load-free at a predetermined rotational speed. The desired value of the rotational speed is obtained by the line-commutated converter SR, and thus by the controller RD, from the control system S of the printing machine. Thus, the magnitude and polarity of the armature current IA are set by the controller RD in accordance with the desired values received from the control system S. Specifically, the controller RD applies a gate signal to one of the solid state switches 12, 14 thereby causing that switch to deliver an armature current IA of a given magnitude to the motor M. As mentioned above, the magnitude of the armature current IA delivered to the motor M is proportional to the applied gate signal, and the polarity of the armature current IA is dependent upon which solid state switch 12, 14 the controller RD selects for conduction. Thus, the controller RD sets the level of the armature current IA and triggers the appropriate switch to either drive or brake the motor M in accordance with a reference signal received from the control system S.

As mentioned above, the motor M has an assigned tachometer T. This tachometer monitors the motor M by generating an electrical signal which is proportional to the rotational velocity of the motor. As shown in FIG. 1, the tachometer T is connected in a feedback loop with controller RD and power part LTA such that the D.C. motor is operated at a controlled rotational velocity. To this end, the electrical voltage signal generated by the tachometer is fed to the controller RD which compares that voltage with a reference signal received from the control system S and adjusts the gate current supplied to the conducting solid state switch 12, 14 as necessary to correct any errors in the D.C. motor's rotational velocity. Thus, the controller RD, the power part LTA, and the tachometer T combine to maintain the rotational velocity of the motor M at a speed prescribed by the control system S.

Figure 4:
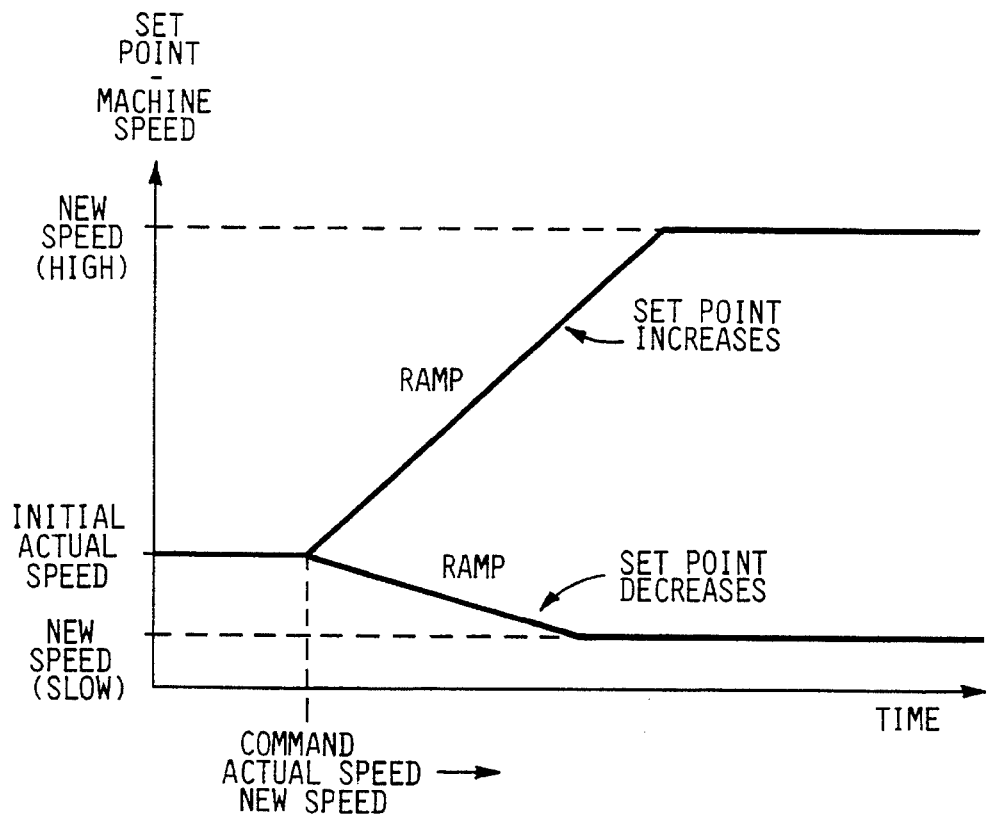
FIG. 4 is a graph illustrating the rate of change of the speed of the printing machine in response to an operator's changes in the operating set point of the machine.

As shown in FIG. 4, when the control system S calls for a change in the operating speed of the D.C. drive mechanism, the controller RD preferably adjusts the rotational velocity of the D.C. motor M in accordance with predetermined time ramps. In other words, instead of increasing or decreasing the rotational velocity of the motor M at whatever rate the power supply and solid state switches allow by attempting to immediately drive the armature current to the newly demanded level, the controller RD increases or decreases the armature current IA at a controlled rate. For example, if the printing machine is operating at an initial speed (i.e., the D.C. motor M is operating at a first rotational velocity) and the user decides to perform a new operation requiring the machine to operate at a higher speed, the control system S will supply the controller RD with a new reference signal. Since the motor M is operating at the first rotational velocity, the signal generated by the tachometer T will now differ from the reference voltage. Rather than immediately jumping the gate current of the conducting solid state switch 12, 14 to drive the armature current IA to a level sufficient to achieve the required rotational velocity, the controller RD gradually increases the gate current in accordance with a predetermined programmed time ramp as shown in FIG. 4. Thus, the rotational velocity of the D.C. motor increases at a steady rate rather than attempting to jump to the newly required velocity immediately.

Similarly, if the user wishes to perform a printing operation which requires the printing machine to operate at a slower rate (i.e., the D.C. motor M to operate at a second, lower rotational velocity), the controller RD decreases the gate current of the conducting solid state switch 12, 14 in accordance with a predetermined programmed time ramp until the newly required operating speed is achieved. Some of the advantages of these controlled adjustments of the operating speed of the printing machine include reducing stress on the components of the machine and ensuring consistent operation from adjustment to adjustment.

In order to provide the motor M with a field current IF, the line-commutated converter SR is provided with a second power part LTF having an associated controller RF. This power part LTF is similar to the power part LTA but instead of including two solid state switches, it includes only one solid state switch 16 connected between the power supply 20 and the motor M. As in the power part LTA, this solid state switch 16 can be a silicon controlled rectifier.

In order to control the amount of current conducted by this solid state switch 16, the line commutated converter SR is further provided with a controller RF. This controller RF is substantially similar to controller RD in that it applies a gate current to the solid state switch 16 to control the level of field current IF supplied to the motor M. The level of this current IF is set by the control system S.

The control system S is operationally connected to emergency STOP pushbuttons NA. It is also operationally connected to additional switches 40 positioned on the safety guards of the printing machine. These additional switches 40 are switched between states by opening and closing the safety guards. Thus, they provide the control system S with information concerning the position of the guards.

If, during the operation of the printing machine an emergency STOP button NA is actuated or one of the safety guards is opened, the control system S of the printing machine transmits a control signal to the line-commutated converter SR indicating that electrical braking of the motor M should be initiated. In response, the controller RD of the line-commutated converter SR terminates the gate signal to the solid state switch in the power part LTA which was providing a driving armature current IA and applies a gate signal to the other solid state switch in the power part LTA to thereby apply a braking armature current IA to the motor M. Unlike the situation described above where the control system S adjusts the operating speed of the D.C. motor M to perform a different printing operation by gradually adjusting the armature current IA supplied to the motor M in accordance with a predetermined time ramp, when an emergency STOP signal indicating the need for emergency braking is detected the controller RD drives the armature current IA down to the current limit so that the D.C. motor M is brought to a stop as quickly as possible. Thus, in trouble-free, ordinary circumstances, the control system S and the line-commutated converter SR employ purely electrical braking to drive the rotational speed of the motor M down as rapidly as possible. Such purely electrical braking is gentle on the mechanical drive parts of the printing machine.

In accordance with the invention, a control circuit ÜE is provided for monitoring the braking sequence to insure that the D.C. motor is brought to a standstill within a predetermined time period. To this end, the control circuit or monitoring device ÜE receives and monitors electrical signals corresponding to the armature current IA, the field current IF and the armature voltage UA of the D.C. motor M. These signals are transmitted to the monitoring device DE through well known signal monitoring circuitry such as the circuitry labelled SIA and SIF in FIG. 1. The monitoring circuitry SIA for the armature current IA and the monitoring circuitry SIF for the field current IF can be, for example, a shunt resistor connected in series with the armature winding (or field winding) or a sensor such as a Hall probe positioned to detect the strength of the magnetic field caused by the armature current IA or field current IF. The monitoring circuitry (not shown) for the armature voltage UA can comprise any of a number of well known voltage monitoring devices such as an analog to digital converter or the like.

In accordance with the invention, the monitoring device ÜE is connected to the emergency STOP pushbuttons NA and the switches 40 mounted on the safety guards of the printing machine via a dedicated bus system as diagrammatically illustrated in FIG. 1. The actuation of an emergency STOP pushbutton or of a switch fitted on a guard is thus detected by both the control system S and the monitoring device ÜE. Both the control system S and the monitoring device ÜE are connected to the emergency stop terminal NH of the line-commutated converter SR. Actuation of this emergency stop terminal NH causes the power converter SR to initiate the electrical braking process described above. Thus, the system is redundantly wired such that either the control system S or the monitoring device ÜE can initiate the emergency braking sequence upon detection of an emergency stop signal.

Figure 5:
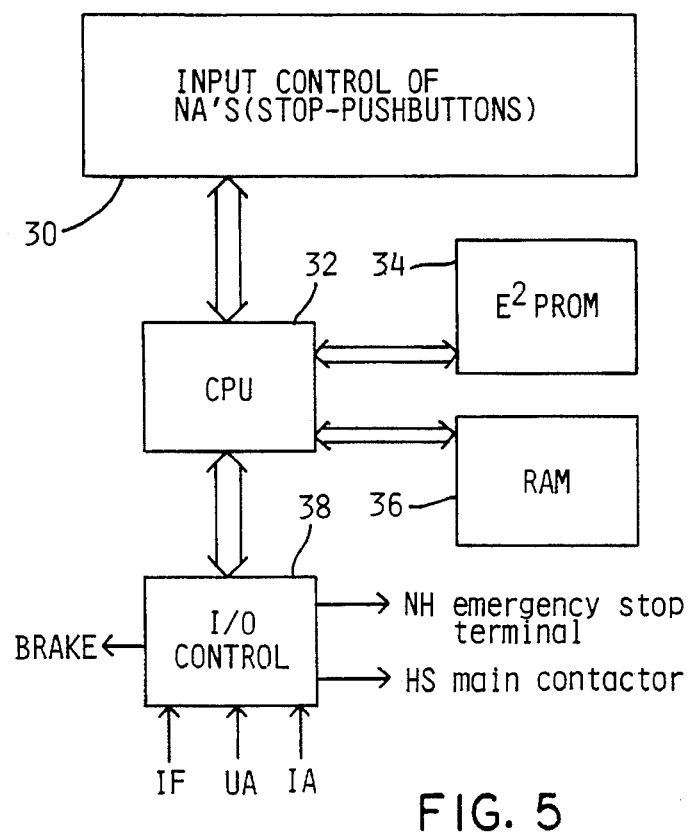
FIG. 5 is a block diagram representation of a monitoring device of FIG. 1.

The monitoring device ÜE is shown generally in FIG. 5. As illustrated in that figure, the monitoring device or control circuit ÜE includes a first input/output control device 30 for monitoring the emergency stop pushbuttons NA and the switches 40 on the safety guards; a central processing unit 32 for performing the logic and control functions of the device ÜE ; a memory 34 such as an electrically erasable programmable read only memory (E²PROM) which can be used, for example to store the operating code of the central processing unit; a random access memory 36 (RAM); and a second input/output control device 38 for both receiving the electrical signals corresponding to the armature current IA, the field current IF and the armature voltage UA, and for transmitting control signals to the electromechanical brake B, the main contactor HS and the emergency stop terminal NH of the line-commutated converter SR when appropriate. The monitoring device ÜE can be implemented using the commercially available 80188 processor marketed by Intel.

Figure 6:
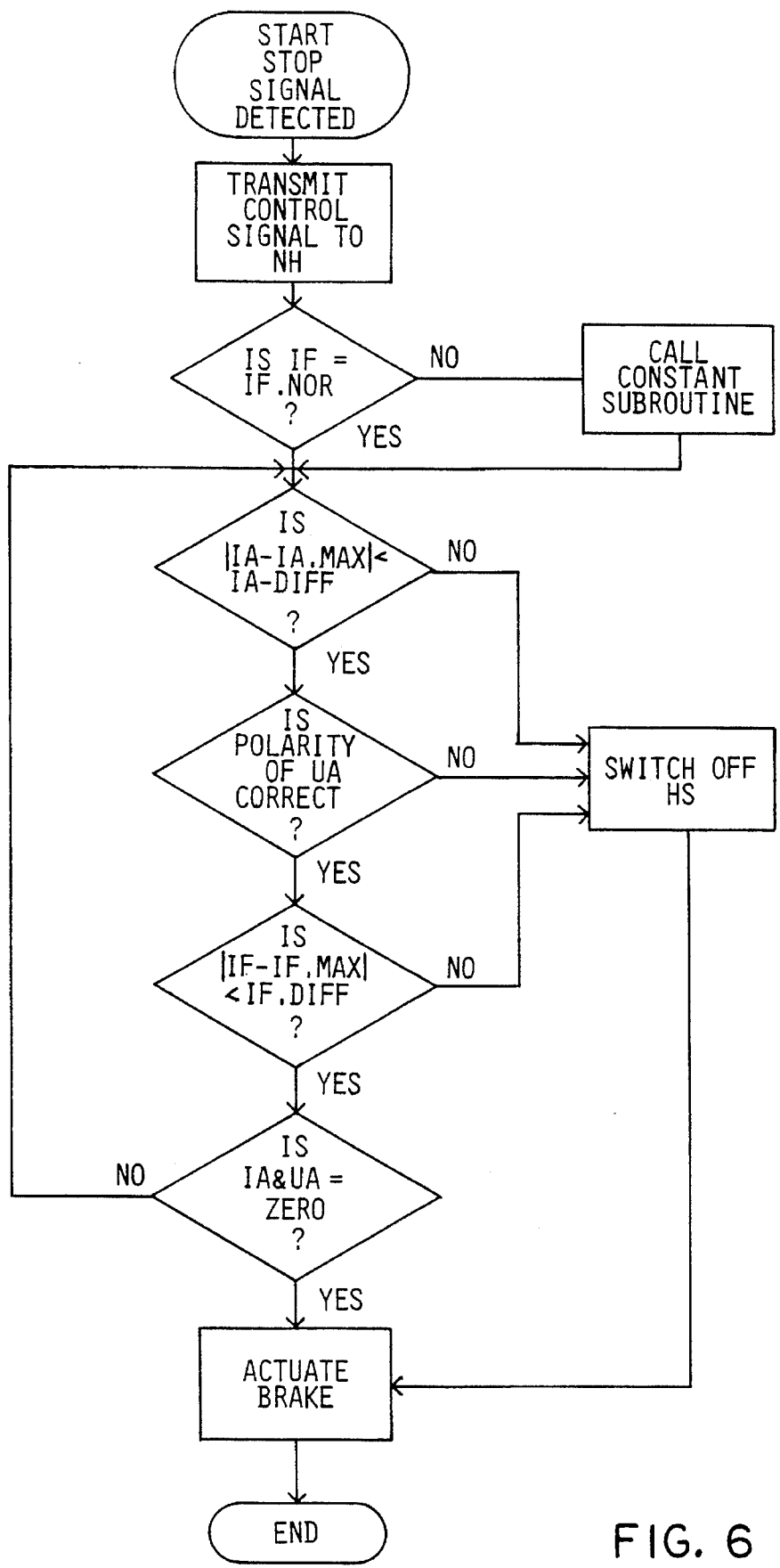
FIG. 6 is a flow chart of the steps performed by the monitoring device.
Figure 7:
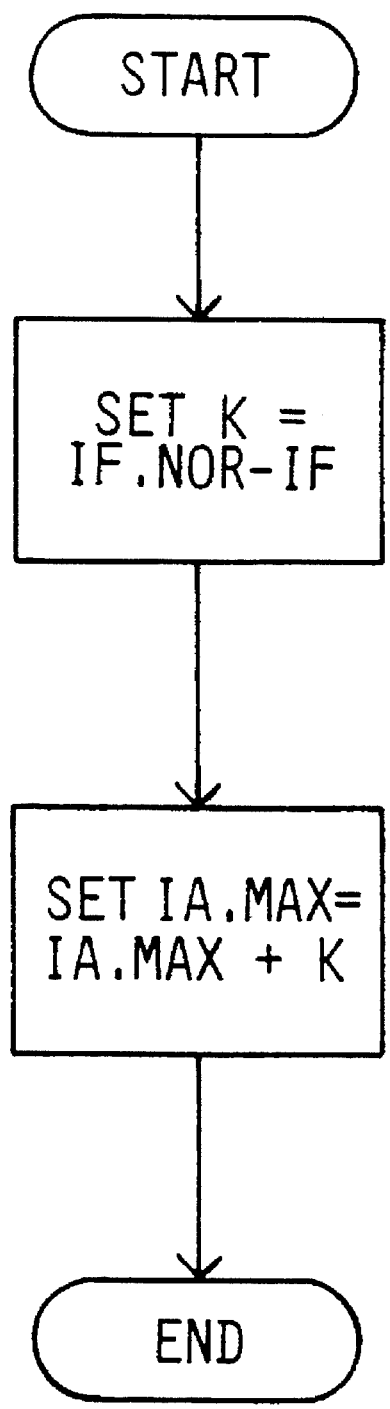
FIG. 7 is a flow chart of a subroutine performed by the monitoring device.

The programmed steps performed by the control circuitry ÜE are illustrated in FIGS. 6 and 7. As shown in FIG. 6, when the monitoring device ÜE first detects an emergency stop signal indicating that an emergency stop pushbutton NA has been actuated or a safety guard has been opened, it transmits a control signal to the emergency stop terminal NH of the line-commutated converter SR. Then, after the converter SR has applied the braking armature current IA to the D.C. motor M, the monitoring device ÜE compares the measured armature current IA to a predetermined maximum braking current constant (IA.MAX) stored in its memory. If the braking armature current differs from this maximum braking current constant by an amount in excess of a predetermined maximum braking current deviation constant (IA.DIFF), the monitoring device ÜE switches the main switch or contactor HS of the line-commutated converter SR to the off state thereby disconnecting the converter SR from the power supply 20 and actuates the electromechanical brake B via a control signal. The D.C. motor M is thus rapidly brought to a standstill.

If the armature current IA falls within the acceptable range around the stored maximum braking current constant as defined by the maximum braking current deviation constant, the monitoring device ÜE then checks the polarity of the armature voltage UA. If that polarity is incorrect (i.e., if it indicates that a driving armature current rather than a braking armature current is being applied to the motor M), the monitoring device ÜE triggers the main switch HS and actuates the electromechanical brake B as described above.

If the polarity of the armature voltage UA is correct, the monitoring device ÜE then compares the magnitude (i.e., the absolute value) of the field current IF to a predetermined field current constant (IF.MAX) stored in memory. If the magnitude of the measured field current IF differs from the stored field current constant by more than a predetermined amount defined by a predetermined field current deviation constant (IF.DIFF), the monitoring device trips the main switch and actuates the brake B in the manner described above.

If the field current IF falls within the acceptable range, the braking sequence is progressing satisfactorily without involving the brake B and the printing machine will apparently be brought to a standstill in the required time period through purely electrical braking. In order to insure that this conclusion remains accurate, the monitoring device ÜE continues to monitor the armature current IA, the armature voltage UA, and the field current IF in the manner described above until it determines that both the armature current IA and the armature voltage UA have reached zero. Once this state is reached, the monitoring device determines that the D.C. motor M has been brought to a standstill and actuates the electromechanical brake B as a parking brake.

When the D.C. motor M is braked through a purely electrical braking sequence, the braking armature current must be terminated at approximately the instant the motor M reaches a standstill or the printing press will be driven in reverse. To this end, when the tachometer T determines that the rotational speed of the D.C. motor M has reached zero, the controller RD switches the solid state switch supplying the braking armature current to the off state by terminating its gate current. As a result, the braking armature current IA is terminated when the rotational velocity of the motor M reaches zero and the printing machine will not be driven in reverse.

Figure 2:
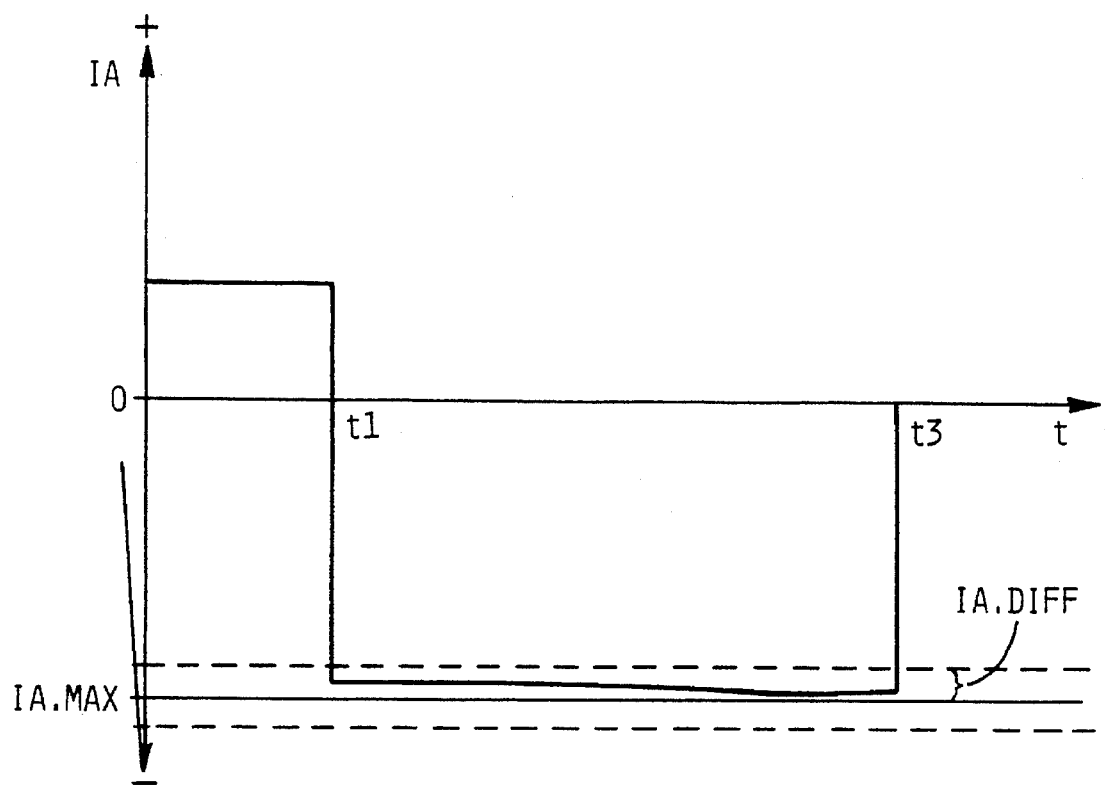
FIG. 2 is a graph illustrating the variation of the armature current over time during a purely electrical braking operation.

FIG. 2 graphically illustrates the variation with time of the armature current IA during a trouble-free, purely electrical, braking operation performed by the power converter SR and the D.C. motor M. In the example of FIG. 2, it is assumed that the printing machine is running at a specific operating rotational speed up to an instant t1. In accordance with the load torque occurring at that time, the armature current IA has a specific positive value. At an instant t1, the monitoring device ÜE and the control system S receive an emergency STOP signal triggered, for example, by the actuation of an emergency STOP pushbutton NA. The control system S and the monitoring device ÜE switch the emergency stop terminal NH at approximately the same time. The power converter SR then connects the D.C. motor M to the power supply 20 as a generator for braking. In other words, the controller RD terminates the gate current to the solid state switch supplying a driving armature current IA and applies a gate signal to the solid state switch to apply a braking armature current IA having a polarity opposite the driving armature current. The converter SR drives the magnitude of this braking armature current IA to a maximum value IA.MAX. The D.C. motor M of the printing machine is thus electromagnetically braked using the maximum torque and reaches a standstill at an instant t3 whereupon the braking armature current IA is terminated by switching the appropriate solid state switch in the power part LTA to its off state.

Figure 3:
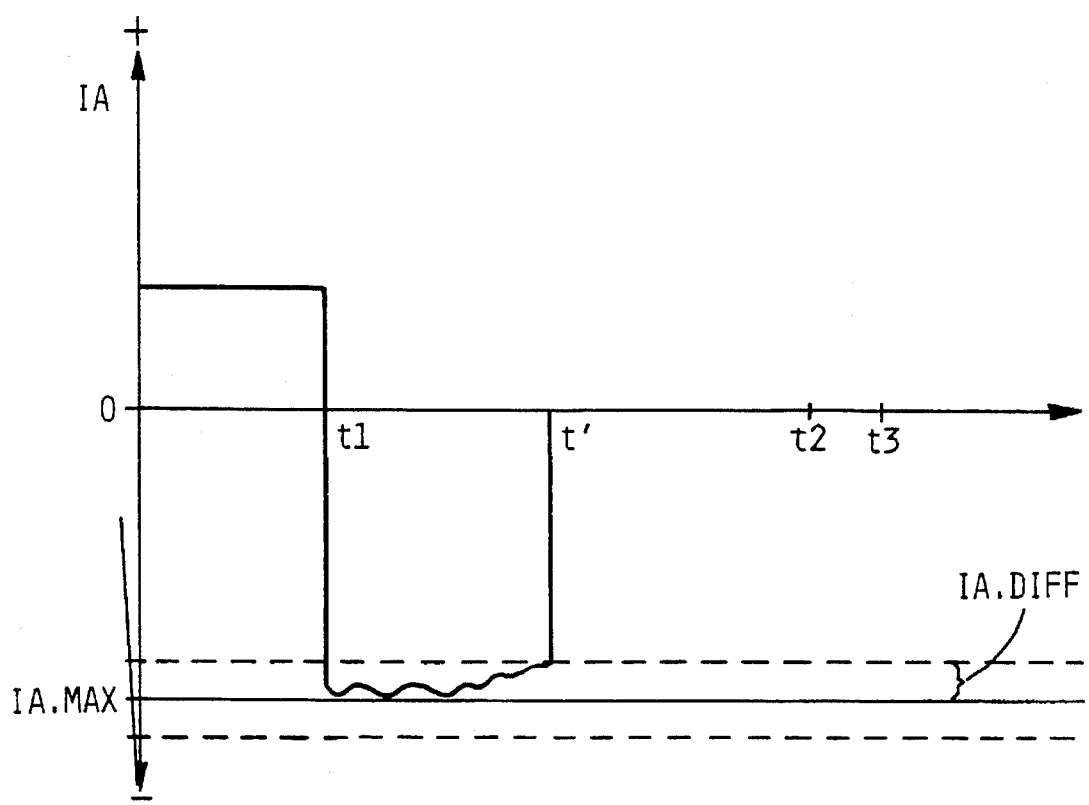
FIG. 3 is a graph similar to FIG. 2 but illustrating a braking operation involving the actuation of the electromechanical brake.

FIG. 3 graphically illustrates the time behavior of the armature current IA wherein the monitoring device ÜE determines that purely electrical braking will not bring the D.C. motor M to a standstill within the prescribed time period. In this example, the emergency STOP command is received by the monitoring device ÜE and the control system S at approximately time t1. At this instant, the monitoring device ÜE and the control system S trigger the emergency stop terminal NH of the power converter SR to initiate a purely electrical braking sequence as described above. In this example, however, it is assumed that a defect occurs in either the D.C. motor M or in the power converter SR at a time t' which causes the armature current IA to deviate from the maximum value IA.MAX. (i.e., the predetermined maximum braking current constant) by a specific amount.

As mentioned above, the monitoring device ÜE contains a stored maximum braking current deviation constant, IA.DIFF. This maximum deviation constant, IA.DIFF, represents the maximum permissible difference between the braking armature current IA measured in the D.C. motor M and the predetermined braking armature current constant, IA.MAX At instant t' the disturbance assumed in this example causes the braking armature current IA to deviate from the predetermined maximum braking current value IA.MAX by an amount in excess of IA.DIFF. As a result, the main contactor HS is actuated by the monitoring device ÜE thereby disconnecting the power converter SR from the power supply 20 and, the brake B is applied to the motor M. The D.C. motor M thus becomes current-less and hence torque-free after the instant t' with the result that the printing machine is braked by means of the electromagnetically actuated brake B and the load torque. Since the braking torque of the brake B is higher than the drive or braking torque which can be achieved through purely electrical braking of the D.C. motor M at the current limit thereof (maximum value of the armature current IA.MAX), the printing machine now comes to a standstill at an instant t2 <t3. Hence it is ensured that, as a result of a disturbance in the power converter SR or in the D.C. motor M, the printing machine is brought more rapidly to a standstill than can be achieved in a purely electrical, trouble-free, braking operation.

In accordance with the invention, the monitoring device ÜE is adapted to check for both an overshoot and an undershoot in terms of absolute value of the braking armature current IA relative to the predetermined maximum braking current value IA.MAX. Thus, the monitoring device can determine (1) whether a fault in the electronics has caused the electrical braking effect of the D.C. motor M to become excessively small such that a predetermined maximum stopping time after the emergency STOP command cannot be achieved, and (2) whether an excessive braking armature current IA has been applied to the D.C. motor M. When such an excessive braking armature current is detected, the monitoring device ÜE switches the power converter SR current-free by switching the main contactor HS to disconnect the power supply and applies the electromechanical brake B to the motor M. However, it will be appreciated by those skilled in the art that, from a safety standpoint, overly fast stopping is preferable to excessively slow stopping. Therefore, it will be appreciated that, if the user prefers, the monitoring device ÜE can be adapted to check only for undershoots in the armature current IA without departing from the scope or spirit of the invention.

As mentioned above, the monitoring device ÜE also detects the values or corresponding signals representing the values of the armature voltage UA and the field current IF. Thus, the monitoring device ÜE can also detect any impermissible undershoots and overshoots of the ordinarily constant field current IF relative to a predetermined field current constant, IA.MAX. If the magnitude of such an overshoot or undershoot exceeds a predetermined maximum field current deviation constant, IF.DIFF, the monitoring device ÜE switches the main contactor HS to disconnect the converter SR from the power supply 20 and actuates the brake B.

This additional monitoring of the field current IF during the process of electrical braking is particularly advantageous because the field current IF and the armature current IA both influence the magnitude of the braking torque of the D.C. motor M. For example, a field current IF which has dropped off below a specific value is no longer able to ensure, given a predetermined maximum value of the armature current, IA.MAX, that the electrical braking applies sufficient torque to bring the motor M to a standstill within the required time period. Thus, in accordance with an aspect of the invention, the monitoring device ÜE can be adapted to adjust the value of the predetermined maximum braking current constant (IA.MAX) based on the measurements of the field current IF. For example, if the monitoring device ÜE detects a field current IF which is lower than normal (i.e., less than a normal field current constant, IF.NOR), it can increase the maximum braking current constant (IA.MAX) by an amount (K) equal to the difference between the measured field current IF and the normal field current constant (IF.NOR) such that the applied braking armature current IA compensates for this low field current. Similarly, if the magnitude of the field current IF is higher than normal (i.e., greater than the normal field current constant, IF.NOR), the monitoring device ÜE can decrease the maximum braking current constant (IA.MAX) by an amount (K) equal to the difference between the measured field current IF and the normal field current constant (IF.NOR) such that the applied braking armature current IA compensates for this high field current. As a result, the monitoring device ÜE insures that the electrical braking process takes place with substantially the same braking torque regardless of fluctuations in the field current IF. The subroutine performed by the monitoring device ÜE to adjust the maximum braking current constant is shown in FIG. 7.

It will be appreciated that, although this optional operation of monitoring the field current IF has been illustrated as being performed once at the start of the braking sequence in FIG. 6, the operation could be performed multiple times during the electrical braking sequence if so desired without departing from the scope or the spirit of the instant invention.

As an additional measure, the monitoring device ÜE also monitors the armature voltage UA. It can be determined from the polarity or sign of the armature voltage UA (or the sign of the armature current IA) whether electrical braking is actually being carried out. If only the magnitude or absolute value of the armature current IA were monitored, in the event of a disturbance of the current of the converter SR, an armature current of the wrong polarity could theoretically be applied to the D.C. motor M thereby accelerating the motor M to the current limit IA.MAX. This situation, which is to be avoided in any case, is prevented by insuring that the armature voltage UA has the correct polarity.

In addition, the monitoring device ÜE monitors the sign of the armature current IA and of the armature voltage UA in order to determine the instant when standstill of the machine occurs. Such a standstill occurs when both the armature current IA and the armature voltage UA becomes zero. A current-less switching of the power converter SR and the actuation of the brake (B) are then carried out.

The invention makes use of the fact that, in the case of a purely electrical braking of a remotely excited D.C. drive, the drive or braking torque is exactly proportional to the magnitude of the armature current IA. In addition, a sheet-fed offset printing machine has a minimum load torque which is increased during operation by the tackiness of the printing ink, the print feed adjustment, paper run and other factors. Accordingly, the D.C. drive and the power converter are matched in such a way to the load torque of the machine that, in the trouble-free case, the braking process triggered by an emergency STOP command can be carried out by the power converter SR purely electrically. As a result, the machine is always braked with maximum acceleration.

In summary, it will be appreciated that the instant invention provides a method and system for performing that method wherein, following an emergency STOP command, the armature current IA of the D.C. drive is driven via the power converter SR to the current limit. The monitoring principle according to the invention then determines whether the motor or armature current actually lies within a predetermined tolerance of this current limit. If this is not the case, the power converter SR is disconnected from the power supply and the mechanical brake is applied to the motor to ensure stopping as rapidly as possible. It is thus ensured that the printing machine is braked with the largest possible torque either electrically in the normal case or mechanically in the case of a disturbance—in response to an emergency STOP signal.

What is claimed is:

1. A method for controllably braking a printing machine driven by a D.C. motor having an associated electromechanical brake, the D.C. motor being powered by a line-commutated converter connected to a power supply, the line-commutated converter including a first solid state switch electrically connected to the D.C. motor for delivering driving armature current of a first polarity thereto, a second solid state switch electrically connected to the D.C. motor for delivering braking armature current of a second polarity opposite the first polarity thereto, and a third solid state switch electrically connected to the D.C. motor for delivering field current having a magnitude thereto, the method comprising the steps of:

detecting an emergency stop signal;

switching the first and second solid state switches to supply a braking armature current to the D.C. motor, the braking armature current having a magnitude and a polarity;

detecting the magnitude of the braking armature current;

comparing the magnitude of the braking armature current to a predetermined maximum braking current constant;

actuating the electromechanical brake and disconnecting the line-commutated converter from the power supply if the magnitude of the braking armature current deviates from the predetermined maximum braking current constant by more than a predetermined maximum braking current deviation constant.

2. The method of claim 1 further comprising the steps of:

detecting the polarity of a first armature voltage prior to detecting the emergency signal;

detecting the polarity of a second armature voltage after supplying the braking armature current to the D.C. motor;

comparing the polarity of the first armature voltage to the polarity of the second armature voltage; and, actuating the electromechanical brake and disconnecting the line-commutated converter from the power supply if the polarity of the first and second armature voltages are the same.

3. The method of claim 1 further comprising the steps of:

detecting the magnitude of the field current;

comparing the magnitude of the field current to a predetermined field current constant; and, actuating the electromechanical brake and disconnecting the line-commutated converter from the power supply if the magnitude of the field current differs from the predetermined field current constant by more than a predetermined field current constant.

4. The method of claim 1 further comprising the steps of:

detecting the magnitude of a second armature voltage after supplying a braking armature current to the D.C. motor; and, actuating the electromechanical brake and disconnecting the line-commutated converter from the power supply if the magnitude of the braking armature current and the magnitude of the second armature voltage both equal zero.

5. The method of claim 1 further comprising the steps of:

detecting the magnitude of the field current;

comparing the magnitude of the field current to a normal field current constant;

increasing the predetermined maximum braking current constant by an amount equivalent to the difference between the normal field current constant and the magnitude of the field current if the magnitude of the field current is less than the normal field current constant; and, decreasing the predetermined maximum braking current constant by the amount equivalent to the difference between the normal field current constant and the magnitude of the field current if the magnitude of the field current is greater than the normal field current constant.

* * * * *